United States Patent [19]

Brigano et al.

[11] Patent Number: 5,254,257
[45] Date of Patent: Oct. 19, 1993

[54] RECLAIMING OF SPENT BRINE

[75] Inventors: Frank A. Brigano, Hoffman Estates; William J. Soucie, Grayslake; Stanley F. Rak, Mundelein, all of Ill.

[73] Assignee: Culligan International Company, Northbrook, Ill.

[21] Appl. No.: 5,668

[22] Filed: Jan. 19, 1993

[51] Int. Cl.$^5$ ............................................. B01D 61/04
[52] U.S. Cl. .................................... 210/639; 210/652
[58] Field of Search .............. 210/639, 651, 652, 654, 210/653, 638

[56] References Cited

U.S. PATENT DOCUMENTS 4,176,057 11/1979 Wheatley et al. .............. 210/639 X
4,889,633 12/1989 Pfenninger ..................... 210/639

OTHER PUBLICATIONS

Article by Howard Conner entitled Brine Recovery, (Water Technology, Jul., 1992, pp. 34 and 35.
Article by Larry Lien entitled Nanofiltration: Trend of the Future? from Water Conditioning & Purification, Sep., 1992, pp. 24 et seq.
A photocopy of a data sheet relating to Filmtec Membranes of the Dow Chemical Company, (5 pages).

Primary Examiner—Frank Spear
Attorney, Agent, or Firm—Gerstman & Ellis, Ltd.

[57] ABSTRACT

The method of purifying spent brine from the regeneration of ion exchange resin, for example resin in water softeners. The method comprises acidifying the spent brine to a pH of less than 3 with an acid other than sulfuric acid, which acid is preferably chosen from at least one acid which forms a calcium salt that is more water soluble than calcium sulfate. One passes the brine through a nanofiltration membrane to purify the brine by separating from it a waste stream which comprises the majority of the polyvalent ions present, so that the purified brine has most of its contaminating polyvalent ions removed.

18 Claims, 1 Drawing Sheet

RECLAIMING OF SPENT BRINE

BACKGROUND OF THE INVENTION

Ion exchange resins, and particularly ion exchange resins used in water softeners, mixed bed deionizers, and the like are used to remove polyvalent ions, particularly calcium, iron, magnesium, arsenic, cadmium, lead, and other polyvalent ions that may be found in water. Thus, many homes and businesses use water softeners for the removal of such ions from the water prior to use.

When the ion exchange resin that is used in water softeners becomes exhausted, with an insufficient number of active sites available for further bonding to polyvalent ions,, the ion exchange resin is regenerated by passing brine through it. Brine is a water solution of alkali metal chloride, typically common salt. The sodium in such a brine exchanges with the polyvalent cations on the resin so that the polyvalent cations (calcium, iron, etc.) go back into solution in the brine, being replaced on the resin by sodium ions from the brine. In the past, the spent brine containing such polyvalent cations was then simply discarded down the drain.

However, in many areas, environmental regulations are placing strong constraints upon the nature of the solutions which may be disposed into drains or the ground waters. In arid areas such as California, rigid restrictions are coming into place, providing strong constraints on particularly commercial users of water softners, creating a need to find new ways to dispose of the spent brine. Hence, there is a need for particularly large scale users of brine to reduce the amounts of waste solutions for disposal. Currently, in some areas, such waste brine has to be trucked to a permitted disposal site, or it has to be diluted with tap water before it can be disposed down the drain, both of which techniques are expensive and wasteful of resources.

Recently, as described in the article by Howard Conner entitled Brine Recovery, (Water Technology, Jul., 1992 pages 34 and 35) techniques for recovery of usable brine from spent brine are described. As stated, . in traditional brine reclaiming, the first third of the brine recovered in an ion exchange regeneration process is sent down the drain. The middle third is stored for later use. The final third, containing rinse water, has the lowest ion concentration, and may be also sent down the drain, being typically of acceptable quality for disposal. However, such a technique is not helpful in areas where regulations strongly constrain the disposal of water solutions having higher ionic concentrations such as the first brine third mentioned above.

The above cited article also describes the brine recovery process in which the hardness of the brine (i.e., polyvalent ions) is removed by "nanofiltration", in which membranes are used under conditions in which the sodium chloride of the brine tends to pass through the membrane, while the polyvalent ions are rejected. Sulfuric acid is added to the spent brine for the nanofiltration process, which results in an improvement in the rejection of polyvalent ions. Thus, the rejected component of the solution, which is only a fraction of the volume of the original spent brine, presents a reduced disposal problem while the purified brine, having greatly reduced numbers of polyvalent ions, can be reused, for example in the regeneration of an ion exchange resin.

Thus the quantity of waste product, namely the rejected component of the spent brine, can be disposed of with greater ease and less cost, since its volume is only a fraction of that of the original spent brine. Furthermore, significant savings on both salt and water consumption are provided.

In accordance with this invention, the above process is improved to preferably reduce the cost thereof, and also to reduce the risk of precipitation of solutes in the spent brine prior to nanofiltration. Such precipitated materials can cause clogging and scaling on the surface of the nanofiltration membrane, and thus should be avoided. Particularly, in spent brines where the calcium ion content is high, the sulfuric acid present can result in the precipitation of calcium sulfate, with resulting undesirable results of clogging or scaling, often, an antiscaling agent must be added to the spent brine before nanofiltration in the prior art manner.

DESCRIPTION OF THE INVENTION

The invention relates to a method of purifying spent brine having polyvalent ions, said spent brine being typically from the regeneration of ion exchange resin. The method of this invention comprises the step of acidifying the spent brine to a PH of no more than 3 and preferably no more than about 2, with the acidification taking place with an acid other than sulfuric acid or an acid salt thereof.

One then passes the acidified brine through a nanofiltration membrane to purify the brine by separating from the brine a waste stream which comprises the majority, typically at least 80 percent, of divalent ions present in processed portions of the brine. The divalent ions in the waste stream are typically rejected by the nanofiltration membrane in increased concentration relative to the sodium chloride present in the waste stream, when compared with purified brine which has passed through the membrane.

It has been found that when the nanofiltration membranes used herein are so acid treated to a pH of no more than 3 and preferably below 2, they improve their rejection of polyvalent ions, while maintaining a low rejection of monovalent ions. This takes place particularly with respect to nanofiltration membranes of a type similar to the DS-5 membrane sold by Desalination Systems Inc. of Escondido, California 92025. Thus, most of the sodium and chloride ions of the brine pass through the membrane for reuse, while increased amounts of the polyvalent ions such as calcium, iron, magnesium, carbonate, and sulfate are rejected, to purify and render reusable the permeate brine solution.

Preferably the acid which is chosen to acidify the spent brine in accordance with this invention is at least one acid (or a mixture) which forms a calcium salt that is more water soluble than calcium sulfate at essentially the pH conditions used, typically pH 1-3. Hydrochloric acid is a preferred member of this group because of the high solubility of calcium chloride, and because of the strength and low cost of hydrochloric acid. Other acids which may fall into the same group include nitric acid, nitrous acid, hydrobromic acid, and organic acids such as formic acid or acetic acid.

Thus, by treatment with such acids as the above, nanofiltration membranes may be activated to provide better rejection of polyvalent ions with respect to the passage of monovalent ions such as sodium, without the risk of forming precipitates when higher concentrations of particularly calcium are present in the spent brine.

Thus, by this invention, prefiltering is less needed than in the prior art.

Preferably, best results are achieved when the pH of the spent brine is reduced to less than about 2, (typically 1.5 to 1.9) for the highest rejection of calcium and magnesium ions.

Typically, after passing the spent brine through the nanofilter membrane to remove a waste component with most of the divalent ions, the resulting purified brine is thereafter treated with an alkali to raise the pH to a level where it will be suitable for reuse in the brine regeneration of ion exchange resins, for example pH 4-7. Typically the alkali added is sodium hydroxide, which will neutralize the acid present. If the acid used is hydrochloric acid, a product is of course sodium chloride, which is the major desirable ingredient of brine. However, if desired, other forms of neutralization can be used, for example adding ammonium or potassium hydroxide. Then, one may optionally add sodium chloride as needed to the purified brine to bring it up to the desired strength, followed by reuse of the purified brine to regenerate an ion exchange resin.

The polyvalent ion waste stream can be neutralized prior to disposal or other processing by passing it through a bed of limestone or magnesium oxide.

By the above method there is a significant saving of water in ion exchange regeneration processes, since a large portion of the spent brine is recycled. Thus, substantially reduced amounts of waste solution may be produced by an ion exchange regeneration process in accordance with this invention, which of course simplifies the disposal problem of such waste solution. Also by this invention, the acidification step is cheaper, particularly when hydrochloric acid is used when compared with sulfuric acid of the prior art, and upon neutralization with sodium hydroxide, desirable sodium chloride may be produced in the solution during neutralization, reducing the need for added salt.

Furthermore,, the use of hydrochloric acid or the like in place of sulfuric acid for acidification in accordance with this invention reduces or eliminates the need for an added antiscalant and possibly at least some or all prefilters, since the salts which result from such acidification are more soluble than the sulfate salts produced by the addition of sulfuric acid.

DESCRIPTION OF SPECIFIC EMBODIMENTS

Figure 1:
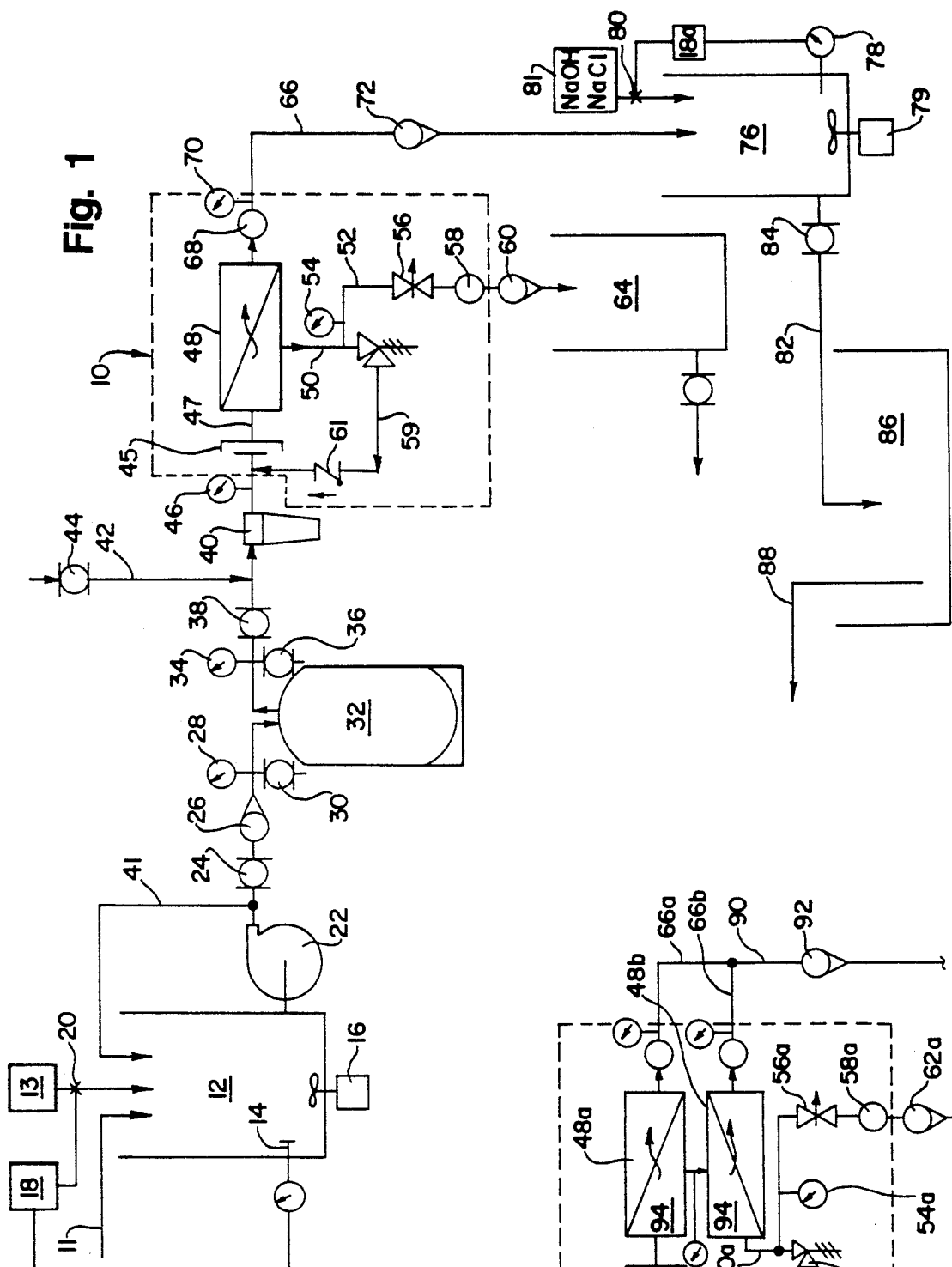
FIG. 1 is a schematic view of a system for purifying and recycling spent brine for reuse.

Referring to. FIG. 1, a schematic system 10 for purifying spent brine is disclosed. The system specifically shown may be used by a dealer of ion exchange type water softening units, where the customers exchange spent units for fresh units, and then the spent units are regenerated by means of brine which is processed by system 10.

Spent brine from a conventional regeneration process is passed through line 11 to tank 12, where hydrochloric acid is added from container 13 to the spent brine in tank 12 to bring the pH of the solution down to preferably no more than 2, for example 1.7. The spent brine may be mixed by a conventional agitator 16, with the pH being monitored by gauge 14. Acid delivery valve 20 is controlled by microprocessor and switch 18 to keep the pH at a desired, low level.

The acidified, spent brine passes through pump 22 and through ball valve 24, fluid volume meter 26, and pressure gauge 28 which has a pressure relief member 30, into optional multimedia filter 32, for physical filtration of particulate matter from the system. The acidified brine then passes through another pressure gauge 34 having another pressure relief valve 36, and ball valve 38, to optional five micron filter 40 for removal of small particulate matter. This rigorous filtration protects and improves the life of the nanofiltration system used in this invention.

Recycle line 41 is provided for use as needed.

A fresh water flush connection line 42 having ball valve 44 is provided for flushing of the system as desired. Also, downstream pH control can be provided here by addition of hydrochloric acid or sodium hydroxide solution, as may be desired.

The acidified, spent brine then passes through another pressure gauge 46 and pressure boost pump 45 in feed line 47 into the nanofiltration system 48, specifically a system available from Desalination Systems Inc. of Escondido, California 92025, using a DS-5 membrane. The nanofiltration system 48 may be of a standard coil type filtration design, having a branched flow line 50 for rejected solution which contains elevated concentrations of polyvalent ions such as calcium, iron and magnesium. Alternatively, a nanofiltration system 48 may be used, having an NF40 or NF45 membrane, sold by the Dow Chemical Company.

Flow line 50 has a first branch 52 which passes across another pressure gauge 54, through a needle valve 56, across an in-line sight flow glass 58, and through a flow volume measurement meter 60 to the receptacle 64 for the rejected waste solution. The second branch line 59 is a recycle line, connecting through check valve 61 to feed line 47.

Nanofiltration unit 48 also connects with a filtrate line 66 which passes through an in-line sight flow glass 68, a pressure gauge 70, and a total volume flow meter 72. Typically, the proportion of rejected solution passing through branch line 50 is about 10 to 50 percent of the total flow, with the balance of the total flow passing through the nanofiltration system 48 as filtrate, then passing through line 66.

The filtrate passes through line 66 into container 76, containing a high proportion of the monovalent ion salts present such as sodium chloride, and being significantly depleted of the polyvalent ion salts, which are rejected and pass to container 64. In container 76, the recovered brine may be further processed by neutralization with, for example, sodium hydroxide, and adding more sodium chloride as needed to account for the loss of sodium ions which replace the polyvalent ions in the process of regenerating the water softeners, and to also account for dilution by rinsing water of the water softener regeneration process. Both the pH and the salinity in container 76 may be monitored by electronic gauge means 78, which communicates with an electronic microprocessor and switch 18a to control valve 80 (which may be a multiple valve) for the selective addition of sodium hydroxide and sodium chloride solutions 81 as may be needed. Agitator 79 stirs solution in container 76.

Line 82, controlled by ball valve 84, conveys the processed brine to a fresh brine tank 86, from which the fresh brine may be taken for the water softener regeneration activities performed in the facility, through line 88.

Thus, by this technique, a major portion of the spent brine is effectively recycled for reuse, saving substantial quantities of water, salt, and expenses of brine disposal. Only the contents of tank 64, containing a relatively high proportion of polyvalent ions and a lesser portion of monovalent ions, are subject to the need for disposal, which greatly reduces the expense thereof. If desired, the concentrated waste solution from tank 64 may be diluted with rinse water from the regeneration rinsing operations, to provide a solution which fulfills environmental regulations for disposal, being diluted by the rinse water to a lower solute concentration level.

Figure 2:
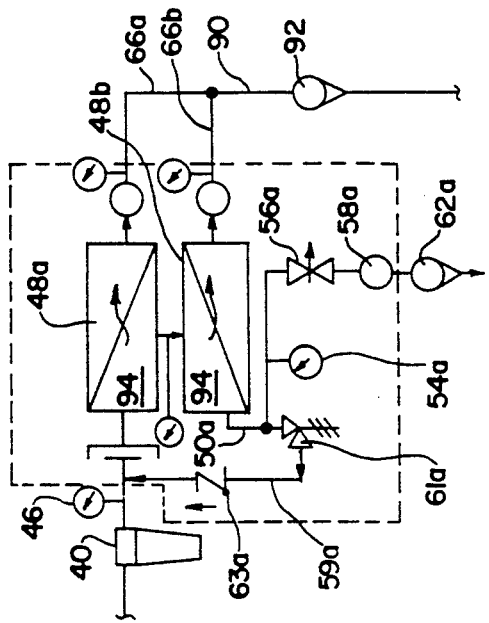
FIG. 2 is a partial, schematic view of another embodiment of a system similar to FIG. 1.

FIG. 2 is a fragmentary view of another embodiment which is similar to the embodiment of FIG. 1 except as otherwise indicated herein.

Spent brine is fed in a manner similar to that disclosed in FIG. 1 to filter 40, which may be identical to the corresponding filter in FIG. 1. Then, brine passes from filter 40 across pressure gauge 46 as in the previous embodiment to a pair of nanofiltration units 48a, 48b connected together in parallel flow relation, to increase the process capacity of the system. The output of purified brine from each of systems 48a, 48b passed through outlet lines 66a, 66b, joining together into a single line 90 which carries a flow volume meter 92 for the purified brine that passes through line 90 and into a recovered brine tank similar to tank 76 of the previous embodiment.

The rejected component of the brine passes from the respective, connected upstream chambers 94 of nanofiltration units 48a, 48b through the rejected component lines 50a, 52a which is similar to lines 50, 52 of the previous embodiment, carrying the same components such as pressure valve 54a, needle valve 56a, in-line-sight flow glass 58a, and flow volume sensing meter 62a, as the reject solution is passed to a reject tank similar to tank 64.

Branch line 59a, similar to line 59 of the previous embodiment, carries a relief valve 61a and a check valve 63a, communicating back to the feed line of acidified, spent brine for the nanofiltration units 48a, 48b.

Experimental work has been performed with respect to the purification of brine containing substantial amounts of calcium and magnesium, passed through a DS-5 (or Desal-5, Type DK) nanofiltration unit, at 200 p.s.i. pressure drop.

For example, a brine feed to which hydrochloric acid had been added to provide a pH of 1.99 at 24° C. had 3560 milligrams per liter of calcium ion and 330 milligrams per liter of magnesium ion. After passing this brine through the nanofiltration system, the filtered brine product retained 660 milligrams per liter of calcium ion and 49 milligrams per liter of magnesium ion, showing that 81 percent of the calcium and 85 percent of the magnesium had been removed. At the same time, no calcium or magnesium-containing precipitate was found in the brine feed despite the relatively high concentrations of calcium and magnesium. Spent brine from ion exchange units may contain calcium and magnesium concentrations that approximate the concentration of the above brine feed tested.

As another example, a similar brine feed which had been acidified to pH 1.55 at 25° C. with hydrochloric acid was passed through a similar nanofiltration membrane unit. This brine feed had 3360 milligrams per liter of calcium ion and 586 milligrams per liter of magnesium ion. The filtered product had 440 milligrams per liter of calcium ion and 61 milligrams per liter of magnesium, indicating the removal of 87 percent of calcium ion and 90 percent of magnesium ion.

As another, higher pH example, a brine feed which is acidified to a pH of 2.43 at 24.7° C. was passed through a similar nanofiltration system. The brine feed contained 3500 milligrams per liter of calcium ion and 464 milligrams per liter of magnesium ion. The filtered brine contained 1,000 milligrams per liter of calcium ion and 61 milligrams per liter of magnesium ion, resulting in the removal of 71 percent of the calcium ion and 88 percent of the magnesium ion.

In the above experiments, the rejection of sodium chloride was low, on the order of 10%.

Accordingly, significant improvements are provided by this present invention in which brine containing polyvalent ions, particularly calcium, magnesium and iron, can be acidified with better solubility of the ions as is strongly preferred for nanofiltration. Additionally, cost savings of various types are achieved by this invention.

The above has been offered for illustrative purposes only, and is not intended to limit the scope of the invention, which is as defined in the claims below.

We claim:

1. The method of purifying spent brine from the regeneration of ion exchange resin, which comprises: acidifying to a pH of no more than 3 said spent brine with at least one acid other than sulfuric acid which forms a calcium salt that is more water soluble than calcium sulfate at said pH; and passing said brine through a nonofiltration membrane to purify said brine by separating from said brine a waste stream which comprises the majority of divalent ions present in processed portions of said brine.

2. The method of claim 1 in which said acid is HCl.

3. The method of claim 1 in which said spent brine is acidified to a pH of no more than 2.

4. The method of claim 1 in which said purified brine which passes through said membrane is thereafter treated with an alkali to raise the pH.

5. The method of claim 4 which said alkali is sodium hydroxide.

6. The method of claim 4 which comprises the subsequent step of reusing said purified brine to regenerate an ion exchange resin.

7. The method of claim 4 which comprises the subsequent steps of adding sodium chloride to said purified brine and reusing said purified brine to regenerate an ion exchange resin.

8. The method of purifying spent brine from the regeneration of ion exchange resin, which comprises: acidifying said spent brine to a pH of less than 3 with hydrochloric acid; and passing said brine through a nanofiltration membrane to purify said brine by separating from said brine a waste stream which comprises the majority of divalent ions present in increased concentration relative to the sodium chloride present in said waste stream, when compared with purified brime which has passed through said membrane.

9. The method of claim 8 in which said spent brine is acidified with hydrochloric acid to a pH of no more than 2.

10. The method of claim 9 in which said purified brine which passes through the membrane is thereafter treated with an alkali to raise the pH.

11. The method of claim 10 in which said alkali is sodium hydroxide.

12. The method of claim 11 which comprises the subsequent step of reusing said purified brine to regenerate an ion exchange resin.

13. The method of claim 9 which comprises the subsequent steps of adding sodium chloride to said purified brine and reusing said purified brine to regenerate an ion exchange resin.

14. The method of purifying spent brine from the regeneration of ion exchange resin, which comprises: acidifying to a PH of no moike than about 2 said spent brine with an acid other than sulfuric acid, said acid being chosen from at least one acid which forms a calcium salt that is more water soluble than calcium sulfate at the pH used in said method; and passing said brine through a nanofiltration membrane to purify said brine by separating from said brine a waste stream which comprises at least 80 percent of the calcium ions present in processed portions of said brine.

15. The method of claim 14 in which said acid is hydrochloric acid.

16. The method of claim 14 in which said purified brine which passes through said membrane is thereafter treated with an alkali to raise the pH.

17. The method of claim 16 in which said alkali is sodium hydroxide.

18. The method of claim 17 which comprises the subsequent steps of adding sodium chloride to said purified brine and reusing said purified brine to regenerate an ion exchange resin.

* * * * *